United States Patent [19]

Arnold

[11] 3,997,199
[45] Dec. 14, 1976

[54] PIPE COUPLING
[75] Inventor: James F. Arnold, Houston, Tex.
[73] Assignee: HydroTech International, Inc., Houston, Tex.
[22] Filed: Mar. 3, 1975
[21] Appl. No.: 554,604
[52] U.S. Cl. .............................. 285/322; 285/348
[51] Int. Cl.² ........................................ F16L 21/06
[58] Field of Search .......... 285/322, 323, 342, 341, 285/18, 339, 374, 421, 113, 404, 348

[56] References Cited
UNITED STATES PATENTS

| 1,545,680 | 7/1925 | Moore | 285/322 X |
| 1,747,782 | 2/1930 | Mahon et al. | 285/348 X |
| 2,478,149 | 8/1949 | Wolfram et al. | 285/342 |
| 3,134,610 | 5/1964 | Musolf | 285/147 X |
| 3,393,926 | 7/1968 | Arnold | 285/322 X |
| 3,713,675 | 1/1973 | White | 285/342 |

FOREIGN PATENTS OR APPLICATIONS

| 215,235 | 5/1961 | Austria | 285/342 |
| 59,457 | 2/1942 | Denmark | 285/342 |
| 961,233 | 6/1974 | United Kingdom | 285/342 |

Primary Examiner—Dave W. Arola

[57] ABSTRACT

A pipe coupling which is mountable on the external surface of a pipe to which the connection is made. The coupling includes annular grip means mounted in the coupling and having an outer axially tapered cam surface and an inward gripping surface for gripping the external surface of the pipe to be joined. An annular bowl member is mounted radially outwardly adjacent to the grip members and is arranged for relative movement therewith and is provided with a tapered surface for engaging and camming the grip means radially inwardly. Annular seal means are provided in the coupling adjacent to the bowl means and an axially movable thrust member is mounted axially adjacent the seal means whereby the application of axial force to the thrust member actuates the seal means and the gripping means. The means for applying the axial force are preferably means operable from a position exterior of the coupling.

1 Claim, 7 Drawing Figures 3,997,199

PIPE COUPLING

BACKGROUNND OF THE INVENTION

1. Field of the Invention

This invention relates to a coupling which is arranged for making a connection to a pipe over which the same is arranged to be fitted. More particularly, it relates to a pipe coupling of the aforesaid type which is preferably operable from a position exterior of the coupling housing to effect setting thereof or engagement thereof with the pipe to which the coupling is to be connected.

2. Description of the Prior Art

Many couplings have been developed in the past for effecting coupling with the exterior surface of a pipe or the like. However, most of the prior art couplings have certain deficiencies, either in terms of not providing an adequate connection which will resist both tension and compression or because of the large and complex nature thereof, making the same uneconomical in some installations. Certain other prior art couplings are too long in axial dimensions and are, therefore, not usable in certain installations.

SUMMARY OF THE INVENTION

It is, therefore, an object of this invention to provide an improved coupling which will overcome the aforesaid problems and which will provide the art with a very simple, easily constructed and easily operable and economical coupling, which is particularly useful in low pressure installations.

Briefly stated, this invention is for a pipe coupling comprising a housing which is arranged for mounting about the external surface of a pipe to which the connection is to be made. Annular grip means are mounted in the housing and have an outer axially tapered cam surface and an inner gripping surface for gripping the external surface of the pipe. An annular bowl means is also mounted in the housing and is arranged for axial movement relative to the grip means and the housing. This bowl means is provided with an outer surface engageable with the inner surface of the housing and an inner axially tapered surface engageable with the outer surface of the grip means for camming the grip means inwardly to the gripping position when the bowl means is moved axially relative to the grip means. Annular seal means are also mounted in the housing axially adjacent the bowl means for engaging the pipe upon axial compression thereof to effect a seal between the housing and the pipe. An axially movable thrust member is mounted axially adjacent to the seal means for axially compressing the seal means to effect the seal as aforesaid. The seal means during compression thereof causes axial movement of the bowl means to thereby inwardly cam the grip means to the gripping position with the pipe. The invention also includes means for applying axial force to the thrust members to move the seal means and the gripping means as aforesaid. Preferably, these means for applying axial force include a plurality of generally axially extending threaded members, each of which is operably connected to the housing and arranged for manipulation from a position exteriorly of the housing.

In certain embodiments, the annular bowl means may include a generally frusto-conical shaped annular bowl ring having axially tapered surfaces on both the interior and exterior surfaces thereof, with the interior surface being arranged for engagement with the first grip means. In this instance, another annular grip means may be mounted in the housing and having an inner axially tapered cam surface engageable with the outer surface of said bowl ring, and an outer gripping surface arranged for gripping the internal surface of the housing.

BRIEF DESCRIPTION OF THE DRAWINGS

Referring now to FIGS. 1 and 2, one presently preferred embodiment of the invention will be described. A coupling generally designated by the numeral 11 is shown comprised of a housing in the form of an outer shell 12 which has connected at the right end, as shown in FIG. 1, as by welding or otherwise, a flange 13 which may be of the tilted type or the standard type for connection to a similar flange on another coupling, as is well known to those skilled in the art. The other end of outer shell 12 has attached thereto an annular flange 14 having a plurality of axially extending bolt holes 15 circumferentially spaced thereabout, each of which is adapted to receive therein a threaded member in the form of a bolt 16. Coupling 11 is arranged for receiving thereinto pipe 18, for example, to which connection is to be made. Outer shell 12 is provided with a radially enlarged portion forming a shoulder 19 and an annular space generally between the enlarged internal surface of outer shell 12 and the exterior of pipe 18 as shown. Mounted in this space is annular grip means in the form of split ring slip 20, having an outer axially tapered cam surface and an inner gripping surface for gripping the external surface of pipe 18. Annular bowl means in the form of floating split ring bowl 21 having the outer surface engageable with the inner surface of outer shell 12 and an inner axially tapered surface engageable with the outer surface of slip 20. This inner surface is arranged for camming the slip 20 inwardly to grip pipe 18 when bowl 21 is moved axially relative to slip 20. The outer surface of bowl 21 is also provided with gripping teeth to grip the inside surface of shell 12.

Annular seal means in the form of a plurality of elastomeric packing rings 25 are mounted axially adjacent the end of bowl 21, as shown. Rings 25 are resilient and deformable such that they effect a seal between outer shell 12 and pipe 18 in response to axial compression thereof.

Figure 1:
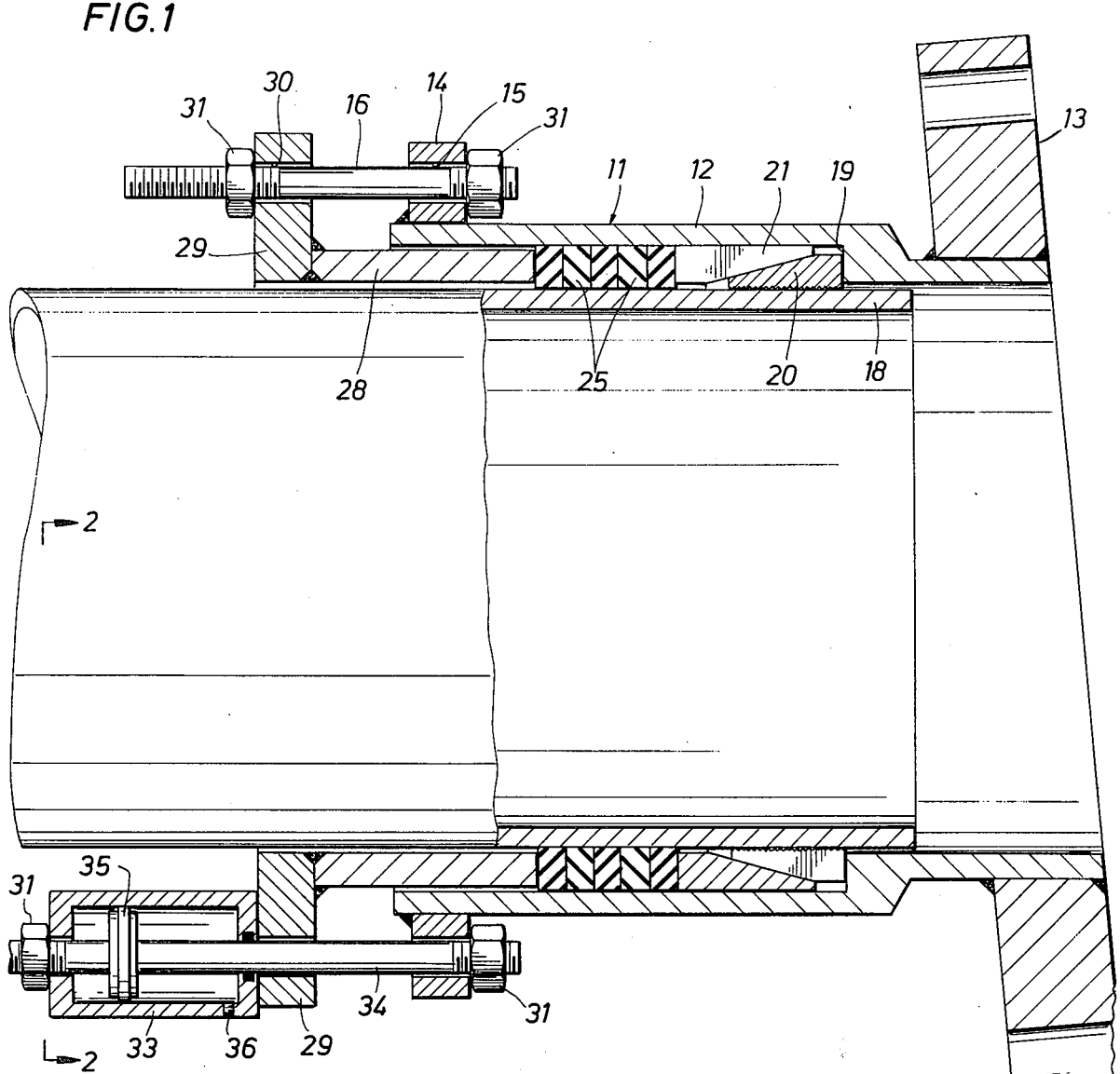
FIG. 1 is a generally central longitudinal sectional view of one embodiment of this invention.
Figure 2:
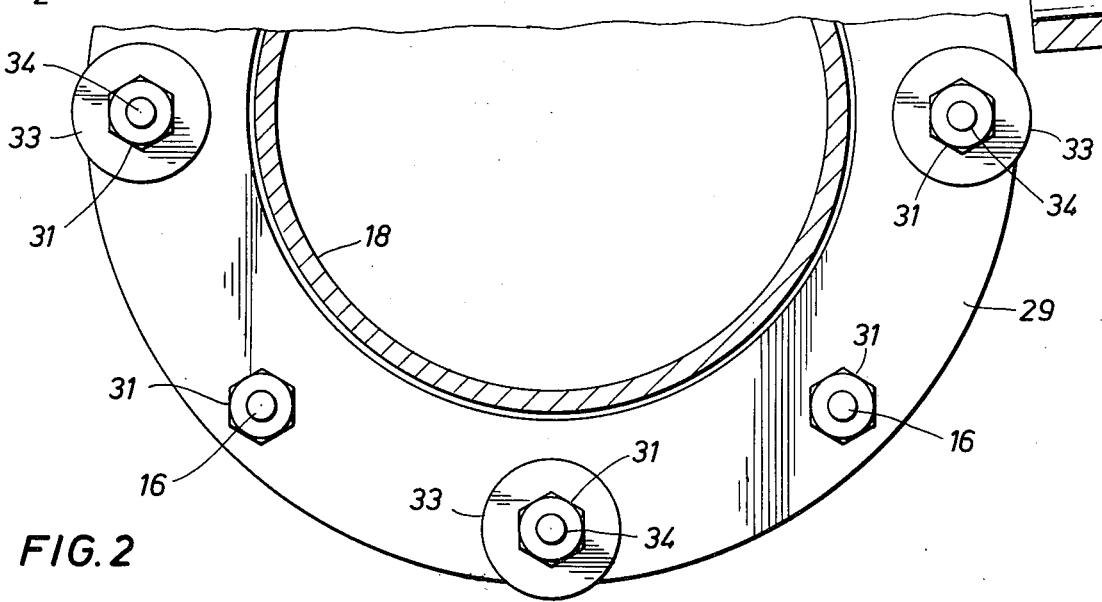
FIG. 2 is a fragmentary cross-sectional view taken generally along lines 2—2 of FIG. 1.

On the other axial side of packing rings 25, there is mounted an axially movable annular thrust member or thrust ring 28. Upon axial movement of thrust ring 28 to the right as shown in FIG. 1, axial force is applied to packing rings 25 to compress the same to the aforesaid sealing position, which in turn causes axial movement of bowl 21 to the right, thereby camming split ring 20 radially inwardly into engagement with pipe 18. It will be noted that the large end of split ring 20 abuts against shoulder 19 during the aforesaid operation.

The coupling includes means for applying axial force to thrust ring 28 to effect the aforesaid movements. This conveniently includes a radially outwardly extending thrust flange 29 attached to ring 28 and having a plurality of circumferentially spaced bolt holes 30 which generally mate with holes 15 in flange 14 and accommodate bolts 16. Bolts 16 may have threaded on each end thereof a nut 31, such that upon threading nuts 31 axially together, thrust ring 28 is caused to move to the right as shown in FIG. 1, thereby causing packing rings 25 to move to the sealing positon and to actuate bowl 21 and slip 20, as aforesaid.

It will thus be observed that the actuation means of the coupling are operable from a point exterior of coupling 11 and can be manipulated by hand.

In certain instances, the tension required for nuts 31 may be greater than that which can conveniently be provided in certain environments, such as certain subsea locations of extreme depth or poor visability or the like. In such instances, an alternative or auxiliary means may be used for providing the aforesaid thrust force. Such auxiliary means are shown in FIG. 1 in the form of hydraulic cylinder 33 shown abutting against flange 29. In this instance, a piston rod 34 is shown passing through cylinder 33 and has mounted thereon piston 35. Each end of piston rod 34 is shown threaded and arranged to receive a nut 35 thereon. Hydraulic cylinder 33 may be arranged for the application of hydraulic fluid to the right side of piston 35, as shown in FIG. 1, through appropriately valved inlet 36. As a result of such hydraulic pressure, piston 35 is driven to the left as shown in FIG. 1, thereby causing flange 29 to move to the right relative to the outer shell 12, thereby providing the aforesaid axial force. Once this operation has been completed, then nuts 35 may be applied by hand or the like to retain thrust ring 28 in the set position. A number of such hydraulic cylinders can be used at circumferentially spaced points around the coupling.

In operation, coupling 11 is initially mounted over pipe 18 with slip 20, bowl 21, packing ring 25 and thrust ring 28 in the relaxed or non-set positions, such that pipe 18 may be readily inserted into coupling 11. Thereafter, the aforesaid axial thrust force is applied to thrust ring 28, as described above, to complete the setting. Thereafter, bias flange 13, for example, may be made up with a similar flange on another coupling, as desired.

It is to be noted that the tapered surface of split ring 20 and bowl 21 are generally the same degree of slope so that the same may slide at the interface therebetween. In certain operations, hydraulic cylinders 33, for example, may be filled with a hardenable epoxy resin, which upon setting will hold thrust rings 28 in the set positions, thereby eliminating the need for nut 31, for example.

Figure 3:
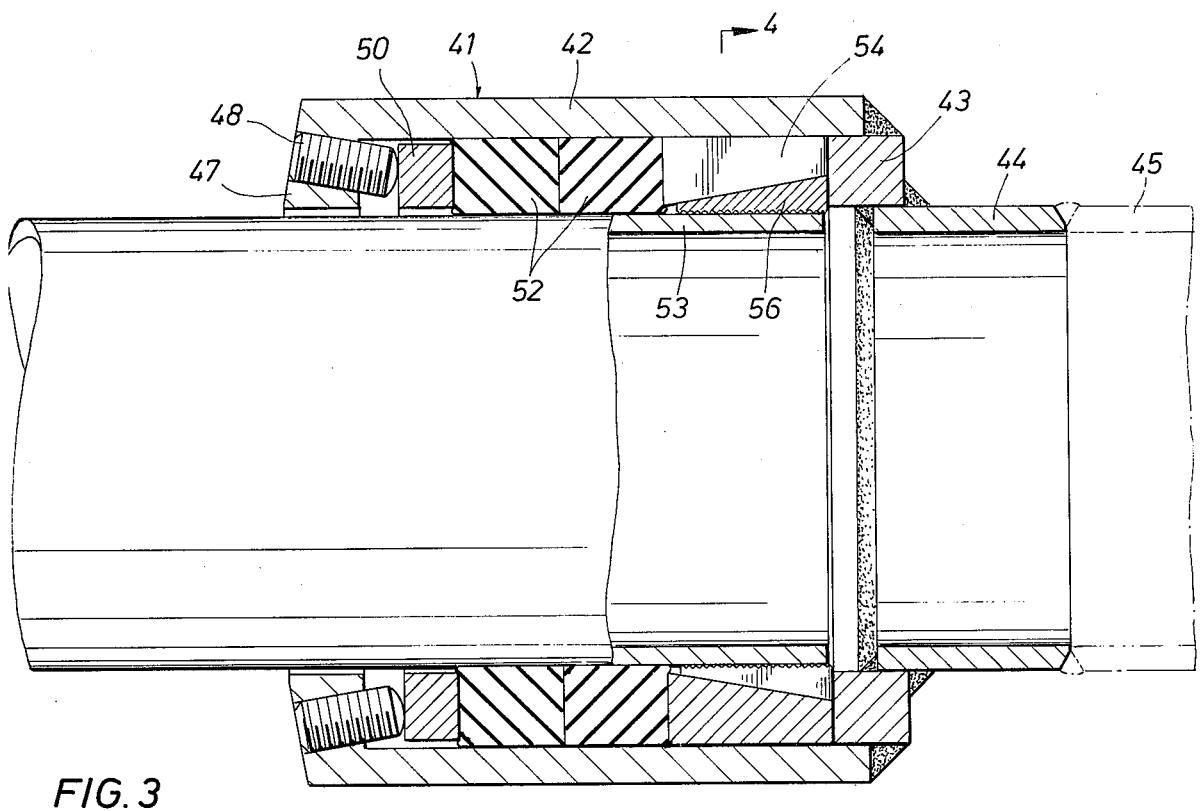
FIG. 3 is a central longitudinal sectional view of another embodiment of the invention.
Figure 4:
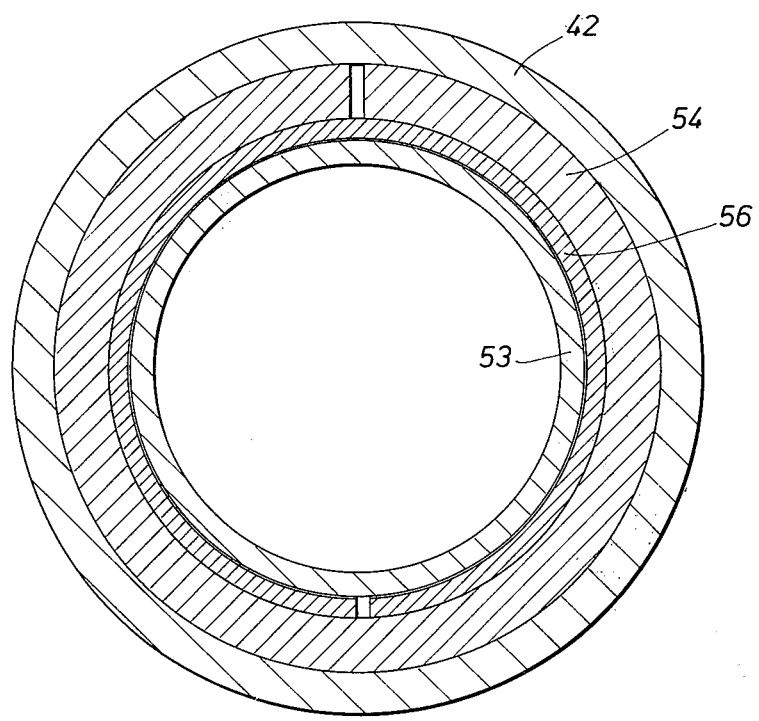
FIG. 4 is a cross-sectional view generally taken along lines 4—4 of FIG. 3.

Referring now to FIGS. 3 and 4, an alternate embodiment of the invention will be described. Here, a coupling is generally designated by the numeral 41 and is comprised of an outer shell 42. The right end of shell 42, as shown in FIG. 3, is shown attached as by welding or the like to a radially extending inwardly extending end-stop flange 43 which, in turn, is connected as by welding or the like to a section of pipe shown as neck 44, which in turn is arranged for welding or otherwise attaching to pipe 45 or the like.

The other or left end of shell 42 as shown in FIG. 3 is provided with a radially inwardly extending flange in the form of setting plate 47, which is provided with a plurality of circumferentially spaced threaded bores therethrough, each of which is arranged to receive an allen-headed set screw 48, with set screws 48 extending in a generally axial direction, having the forward end arranged for engagement with metal compression ring 50.

Compression ring 50 is mounted axially adjacent to a pair of packing rings 52, which are of elastomeric material or the like and arranged for radial deformation into sealing engagement with pipe 53 upon actuation thereof, pipe 53 being the pipe to which connection is to be made. The forward one of the packing rings 52 is arranged for axial abutment against bowl means in the form of floating split ring bowl 54, which has an axially tapered inner surface and a generally cylindrical-shaped outer surface, which is provided with annular gripping teeth for engaging the inner surface of outer shell 42. The aforesaid tapered inner surface of bowl 54 is aranged for camming engagement with grip means in the form of split ring slip 56, the outer surface of which, of course, is tapered to mate with bowl 54 and the inner surface of which is provided with teeth for gripping engagement with pipe 53. It is to be understood that while bowl 54 and slip 56 have both been described as being split rings, it is to be understood that they could also be in the form of partially segmented rings being joined only at the end having the least radial thickness, whereby the same was readily deformed to the sealing or set position upon axial compresionn as aforesaid.

In operation, the coupling shown in FIGS. 3 and 4 is initially mounted on pipe 53 with set screws 48 in the axially retracted position and packing rings 52 in the relaxed nonactuated position and with bowl 54 and slip 56 also in the nonactuated position, such that coupling 41 would freely fit over pipe 53 during initial installation.

Thereafter, axial force is supplied to compression ring 50 by turning said screws 48 in the appropriate manner to thereby uniformly urge compression ring axially to the right as shown in FIG. 3. As such movement continues, packing rings 52 are axially compressed to the sealed position shown, which in turn causes bowl 54 to move axially to the right, thereby camming split ring slip 56 radially inwardly into gripping engagement with pipe 53, as shown. It will be noted that the right end of slip 56, as shown in FIG. 3, abuts against the internal surface of end-stop flange 43 and, hence, is caused to move radially inwardly in response to camming engagement by bowl 54.

Figure 5:
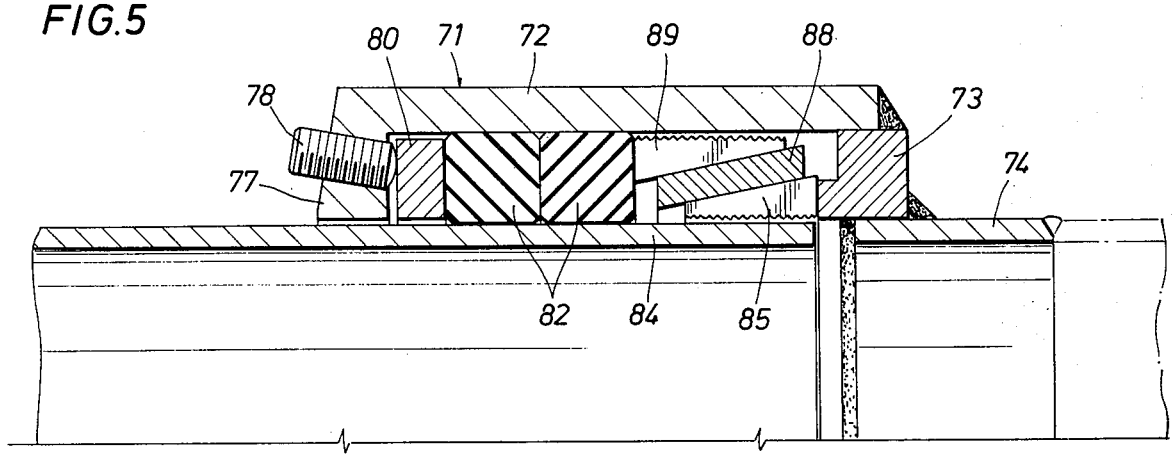
FIG. 5 is a central longitudinal sectional view of another apparatus, which is generally similar to that shown in FIGS. 3 and 4, but having alternate type bowl means shown in the non-set position.
Figure 6:
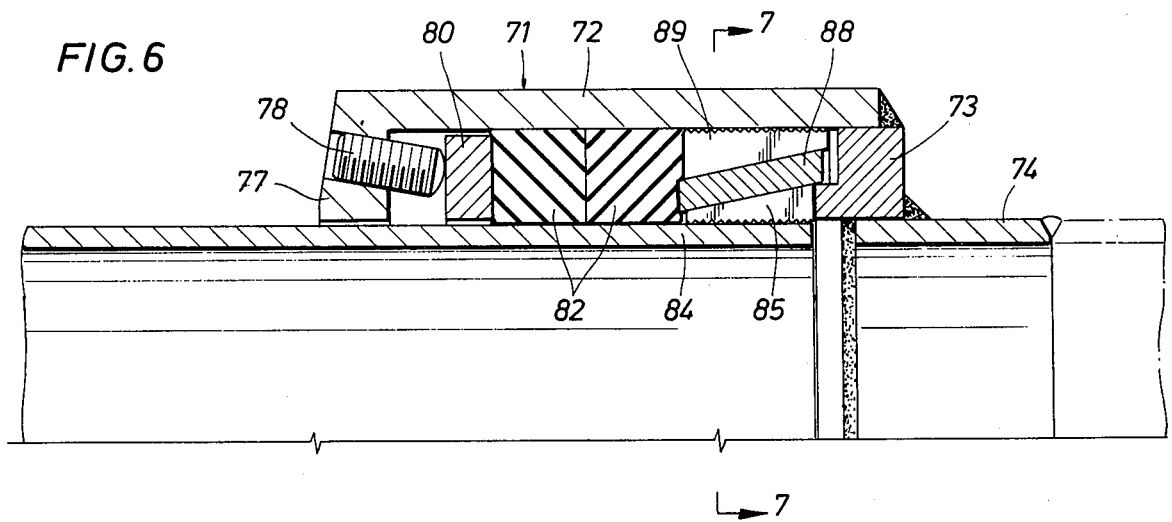
FIG. 6 is a view similar to FIG. 5, but showing the bowl means in the actuated or set position.
Figure 7:
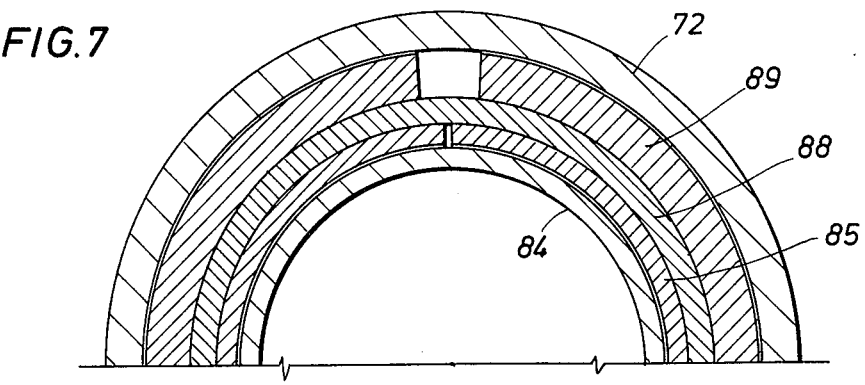
FIG. 7 is a partial cross-sectional view taken generally along lines 7—7, FIG. 6.

Referring now to FIG. 5–7, a still further alternate embodiment of the invention will be described, which further embodiment is generally similar to the embodiment shown in FIGS. 3 and 4, but which has alternate type bowl means. Generally speaking, the coupling of this embodiment is designated by the numeral 71 and includes an outer shell 72, end-stop flange 73 and neck 74, all of which correspond with similar parts in the prior embodiment.

The left end of shell 72 has attached therewith a radially inwardly extending flange forming a setting plate 77, which is similar to plate 47 of the prior embodiment and has mounted therein a plurality of set screws 78 which are similar to set screws 48 of the prior embodiment. Set screws 78 are arranged to bear against metal compression ring 80, which in turn is arranged to axially engage a pair of packing rings 82.

The coupling is shown having a pipe 84 inserted therein for connection thereto. Pipe 84 is arranged for gripping engagement by gripping means in the form of split ring slip 85, which has an axially tapered outer surface and a generally cylindrical inner surface having a plurality of gripping teeth arranged for engaging or gripping the external surface of pipe 84 upon actuation thereof. The right end of slip 85 is arranged for abutment against end-stop plate 73, as shown.

In this embodiment, the bowl means is comprised of a frusto-conical shaped bowl ring 88 and a split ring slip 89. Bowl ring 88 has axially tapered surfaces on both the interior and exterior surface thereof, with the interior surface being arranged for sliding and camming engagement with split ring slip 85. The exterior surface of bowl ring 88 is tapered for mating camming engagement with a similar tapered surface on the internal surface of ring slip 89, as shown. The external surface or ring slip 89 is provided with gripping teeth for engaging the internal surface of shell 72 upon actuation thereof.

In operation, coupling 71 will be in the initially relaxed or nonset position, as shown in FIG. 5 and will then be mounted upon pipe 84, as shown. Thereafter, set screws 88 are threadably engaged through setting plates 77 in a uniform manner so as to urge compression ring 80 axially to the right in a uniform manner, thereby compressing packing rings 82 to the sealing position shown in FIG. 6. Continued pressure applied to ring 80 by set screws 78 causes packing rings 82 to urge split ring slip 89 and bowl ring 88 to the set position shown in FIG. 6. This arrangement of slip 85, bowl ring 88 and split ring slit 89 provides a tool which sets with more uniform engagement, both with pipe 84 and shell 72, than is possible with certain of the other embodiments. Moreover, this arrangement of bowl ring 88 permits greater segmentation of slip 85 and slip 89 without necessarily requiring that segmented portion of each slip mate in the radial direction.

It will be observed that in all the embodiments heretofore described, the novel arrangement of the tool, and particularly of the bowl means and the slip means, provides a tool which will resist axial forces in both compression and tension. This invention provides a tool of relatively simple construction and with a minimum of parts. The particular arrangement of the tool provides a coupling of relatively short axial dimension for effecting a coupling to the exterior of a pipe. The coupling of this invention is arranged for manual setting should that be desired to eliminate costly hydraulic setting mechanism in certain instances. Stated otherwise, either tension or compression forces on the coupling and the pipe to which the connnection is made will simply set the packing tighter in the event that the gripping or bowl means move. However, the bowl means is prevented from movement by the teeth on the exterior of the bowls, which teeth are forced into contact with the internal surface of the housing with the same magnitude with which the gripping means contact the pipe.

By having the tool set by manipulation from the exterior of the coupling the same can subsequently be reset or the setting presure increased at a later date should that be necessary by simply applying additional pressure to the aforesaid compression rings of each of the embodiments as discussed above.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other feateus, all as would be apparent to one skilled in the art after having the benefit of this description of the invention.

What is claimed is:

1. In pipe coupling apparatus, the combination comprising:
    a housing having an open axial end for telescopically receiving the plain end of a pipe to which connection is to be made;
    a first split gripping ring mounted in said housing having an outer cam surface tapered radially inwardly toward said open housing end and an inner generally cylindrical gripping surface having teeth for gripping said plain pipe end;
    a second split gripping ring mounted in said housing and having an inner axially tapered cam surface and an outer generally cylindrical gripping surface having teeth for gripping the internal surface of said housing;
    an annular frusto-conical shaped annular split bowl mounted in said housing and axially movable relataive to said gripping rings and said housing, said bowl having an outer tapered camming surface engageable with said second gripping ring and an inner axially tapered camming surface mateably engageable with the outer tapered surface of said first gripping ring, for camming said first gripping ring inwardly to grip said pipe and said second gripping ring outwardly to grip said housing when said bowl is moved axially relative thereto;
    annular seal means mounted in said housing axially adjacent said bowl for engaging said pipe upon axial compression thereof to effect a seal between said housing and said pipe;
    an axially movable annular thrust member mounted axially adjacent said seal means for axially compressing said seal means against said bowl to effect a seal as aforesaid, said seal means, during compression thereof, causing movement of said gripping rings to said gripping positions;
    and a plurality of generally axially extending bolts threadably engaged in a portion of said housing for applying axial force to said thrust member to move said seal means, said bowl, and said gripping rings as aforesaid.

* * * * *